US008942729B2

(12) United States Patent
LeBlanc et al.

(10) Patent No.: US 8,942,729 B2
(45) Date of Patent: Jan. 27, 2015

(54) LOCATION BASED METHODS, SYSTEMS, AND PROGRAM PRODUCTS FOR PERFORMING AN ACTION AT A USER DEVICE

(71) Applicant: Apple Inc., Cupertino, CA (US)

(72) Inventors: Chelsea J. LeBlanc, Cupertino, CA (US); Christopher S. Linn, Cupertino, CA (US); John-Peter E. Cafaro, Cupertino, CA (US); Lala Dutta, Cupertino, CA (US); Subha U. Gollakota, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 13/633,649

(22) Filed: Oct. 2, 2012

(65) Prior Publication Data

US 2013/0203442 A1    Aug. 8, 2013

Related U.S. Application Data

(60) Provisional application No. 61/594,328, filed on Feb. 2, 2012.

(51) Int. Cl.
*H04M 3/42* (2006.01)

(52) U.S. Cl.
USPC ............................ 455/456.3; 455/414.2

(58) Field of Classification Search
CPC ..... H04W 64/00; H04W 4/02; G06Q 10/109; G06Q 30/08; G06Q 30/0222; G06Q 30/02; G06Q 10/1095; H04M 1/72572; H04M 1/72566; H04L 67/18

USPC ............... 705/14.23; 709/225, 206; 370/503; 342/357.17; 455/456

See application file for complete search history.

(56) References Cited

U.S. PATENT DOCUMENTS

| 2002/0067308 | A1* | 6/2002 | Robertson ................ 342/357.17 |
| 2002/0086680 | A1 | 7/2002 | Hunzinger |
| 2004/0176107 | A1* | 9/2004 | Chadha ..................... 455/456.5 |
| 2004/0252727 | A1 | 12/2004 | Mousseau et al. |
| 2006/0171695 | A1 | 8/2006 | Jung et al. |
| 2006/0179056 | A1 | 8/2006 | Rosenberg |
| 2007/0019068 | A1 | 1/2007 | Arseneau et al. |
| 2008/0214209 | A1 | 9/2008 | Ratnakar |

(Continued)

FOREIGN PATENT DOCUMENTS

| EP | 1 345 148 | 9/2003 |
| WO | 2008/146081 | 12/2008 |

OTHER PUBLICATIONS

International Search Report and Written Opinion of the International Searching Authority, PCT Application Serial No. PCT/US2013/24182, Apr. 9, 2013, 14 pp.

(Continued)

*Primary Examiner* — Nizar Sivji
(74) *Attorney, Agent, or Firm* — Fish & Richardson P.C.

(57) ABSTRACT

Methods, program products, and systems for location-based reminders are disclosed. A first user device can receive an input specifying that a reminder be presented at a given location. The first user device can provide a reminder request, including type and content of the reminder and the location,to a server computer for pushing to one or more user devices. A second user device, upon receiving the reminder request, can determine a device location of the second user device. If the given location matches the device location, the second user device can present the reminder in a user interface.

12 Claims, 9 Drawing Sheets

(56) References Cited

U.S. PATENT DOCUMENTS

| | | | |
|---|---|---|---|
| 2009/0150580 A1* | 6/2009 | Wen | 710/72 |
| 2010/0026526 A1* | 2/2010 | Yokota | 340/996 |
| 2010/0093371 A1 | 4/2010 | Gehrke et al. | |
| 2010/0274691 A1 | 10/2010 | Hammad et al. | |
| 2011/0071893 A1 | 3/2011 | Malhotra et al. | |
| 2011/0177830 A1* | 7/2011 | Clipsham | 455/456.3 |
| 2011/0250875 A1 | 10/2011 | Huang et al. | |
| 2012/0150580 A1* | 6/2012 | Norton | 705/7.19 |
| 2012/0214517 A1* | 8/2012 | Singh et al. | 455/456.3 |

OTHER PUBLICATIONS

European Search Report, dated May 3, 2013, corresponding to European Application No. EP 13152081.9, 8 pages.

"iCloud," [retrieved on Jan. 20, 2014], retrieved from the Internet, <URL:http://web.archive.org/web/20111207174652/https://en.wikipedia.org/wiki/ICloud> published on Dec. 7, 2011 as per Wayback Machine, 7 pages.

Patent Examination Report No. 1, dated Jan. 22, 2014, from corresponding Australian Patent Application No. 2013200351, 5 pages.

* cited by examiner

LOCATION BASED METHODS, SYSTEMS, AND PROGRAM PRODUCTS FOR PERFORMING AN ACTION AT A USER DEVICE

CROSS REFERENCE TO RELATED CASES

This application is a non-provisional of U.S. Patent Application Ser. No. 61/594,328, entitled "Location-Based Methods, Systems, and Program Products For Performing An Action At A User Device", filed on Feb. 2, 2012, which is hereby incorporated by reference in its entirety.

TECHNICAL FIELD

This disclosure relates generally to location-based operations of a computing device.

BACKGROUND

A computer can use a reminder to inform a user that a task needs to be performed or an event is going to happen. For example, a computer can store a to-do list for a user. The to-do list can include a list of one or more tasks. Each task can be associated with a scheduled due date. As the due date of a task approaches, the computer can provide a reminder to the user, for example, by presenting an alert dialog box. In some implementations, the to-do list can be managed by a calendar application program. The calendar application program can allow the user, after logging in, to create or modify the to-do list, and to view the reminders.

SUMMARY

Methods, program products, and systems for location-based reminders are disclosed. A first user device can receive an input specifying that a reminder be presented at a given location. The first user device can provide a reminder request, including type and content of the reminder and the location, to a server computer for pushing to one or more user devices. A second user device, upon receiving the reminder request, can determine a device location of the second user device. If the given location matches the device location, the second user device can present the reminder in a user interface.

Location-based reminders can be implemented to achieve the following advantages. Compared to conventional reminders, location-based reminders can give a user more options on how to set up a reminder. In addition to "when" a reminder is triggered, a user can specify "where" a reminder is fired. For example, a user can set up work-related reminders to be displayed on a computer at work, and household-related reminders to be displayed on a computer at home. On a mobile device, a user can set up two reminders to be displayed at a same time, e.g., Monday morning at 9:00 am, but at different locations. The mobile device can select one of the two reminders to display based on where the mobile device is located. In addition, the user can set up a reminder for a mobile device such that the reminder is presented when the mobile device enters or exits a location.

The details of one or more implementations of location-based reminders are set forth in the accompanying drawings and the description below. Other features, aspects, and advantages of location-based reminders will become apparent from the description, the drawings, and the claims.

BRIEF DESCRIPTION OF THE DRAWINGS

Like reference symbols in the various drawings indicate like elements.

DETAILED DESCRIPTION

Overview of Location-Based Reminders

Figure 1:
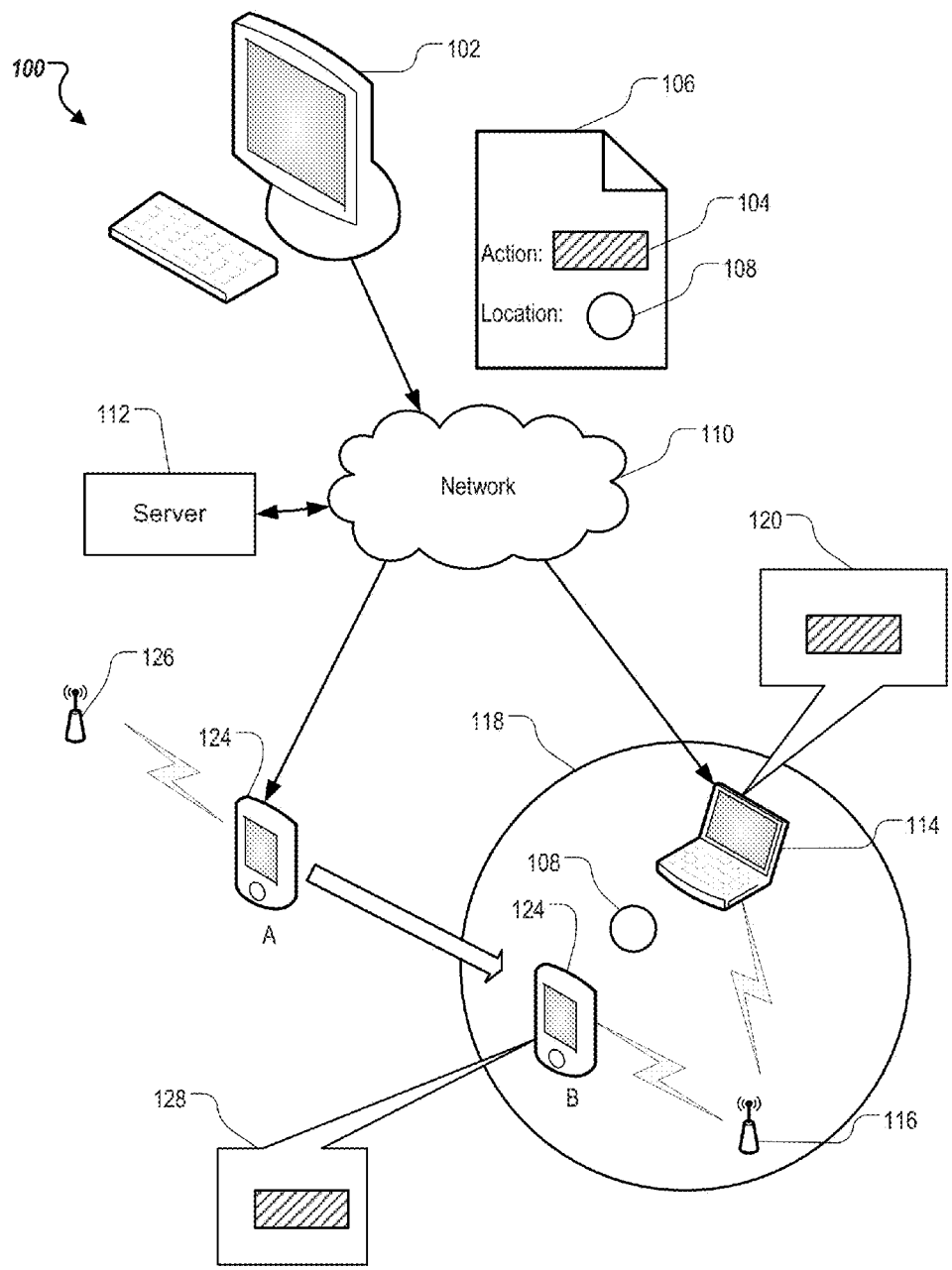
FIG. 1 is a diagram that provides an overview of an exemplary system for location-based reminders.

FIG. 1 is a diagram that provides an overview of exemplary system 100 for location-based reminders. System 100 can include first user device 102. First user device 102 can be a desktop computer or a mobile device, e.g., a mobile phone or tablet computer.

First user device 102 can receive an input to create a reminder. The input can specify action 104 and a venue for performing action 104. Action 104 can be, for example, displaying an alert dialog box, or playing an audio reminder, that contains a message, e.g., "Prepare Tax!!". The venue can be an address or a portion of an address e.g., "100 Oak Street, CA 94063." The venue can be a label, e.g., "Home," that is associated with an address. The venue can be a social event, e.g., "Maker Faire," that is associated with an address in a social event context, e.g., an advertisement or a calendar.

From the input, first user device 102 can generate event 106. Event 106 can include action 104 and event location 108. Event location 108 can include a full address or a set of geographic coordinates or both. First user device 102 can determine event location 108 based on the venue specified in the input. In some implementations, first user device 102 can perform a search, in a database stored on first user device 102 or a server computer located remotely from first user device 102, based on the venue. For example, when the venue specified in the input is "Home," first user device 102 can perform a search in an address book for the full address associated with "Home" as designated by the user providing the input. The address book can be stored on first user device 102 or on a server computer accessible by user device 102.

In some implementations, when the venue is a social event, first user device 102 can perform a search in a social event calendar or an advertisement stored on first user device 102 or on a remote server for an address. For example, first user device 102 can determine that, at the present time, a social event "Maker Faire" is being held at address "100 Oak Street, CA 94063." First user device 102 can then perform another search to determine a latitude coordinate, a longitude coordinate, and an altitude coordinate of the address.

In addition, first user device 102 can create, based on the input, a trigger event for performing the action. The trigger event can specify that the action be performed at the event location, or upon entering or exiting the event location. First user device 102 can store the trigger event in association with action 104 and event location 108 in event 106. Event 106 can be stored in an event list of a scheduler program, e.g., a calendar application program.

First user device 102 can provide event 106, through communications network 110, to one or more server computers 112 located remotely from first user device 102 using synchronization. Server computers 112 can push event 106 to one or more second user devices. Additionally or alternatively, first user device 102 can push event 106 to the second user devices through communications network 110 without using server computers 112. The second user devices can be devices registered to the user who provided the input for generating event 106 or another user that is authorized to view a reminder specified in event 106, e.g., a user who shares an event list with the original user. The second user devices can include mobile devices or stationary devices. A stationary device can be a computer that, although movable, typically stays at a fixed location, e.g., in a building on a particular floor.

The second user devices can include computer 114. Computer 114 can be a computer that is typically stationary, e.g., stays in a home. Computer 114 can be located within a communication range of wireless access point 116. Computer 114 can determine device location 118, which is an estimation of where computer 114 is located, based on wireless access point 116. Wireless access point 116 can be associated with an estimated access point location in a database. The estimated access point location can be statistically determined based on historical data from location-aware devices. The estimated access point location can be stored in association with an identifier, e.g., a media access control (MAC) address, of wireless access point 116. Computer 114 can determine device location 118 based on the estimated access point location of wireless access point 116. For example, computer 114 can designate the estimated access point location of wireless access point 116 as device location 118, or determining device location 118 using the estimated access point location of wireless access point 116 and one or more other estimated access point locations of other wireless access points.

Computer 114 can receive event 106 and determine that event location 108, as specified in event 106, matches device location 118. Determining that event location 108 matches device location 118 can include determining that event location 108 is inside a circle, or a sphere in a three-dimensional space, centered at a set of geographic coordinates and having a radius, as specified by the device location, or that the device location is inside a circle or sphere as specified by the event location. If a distance between the event location and the set of geographic coordinates satisfies a threshold distance, e.g., when the distance is less than or equal to the radius, computer 114 can determine that a condition for triggering action 104 is satisfied. Computer 114 can then perform action 104 as specified in event 106, for example, by providing alert dialog box 120 for display.

In some implementations, the second user devices can include mobile device 124. Mobile device 124 can determine that, initially, mobile device 124 is located at location A. Location A can be remote from first user device 102 and computer 114. Mobile device 124 can determine the geographic location by monitoring one or more wireless access points (e.g., wireless access point 126) that is located within a communication range. Upon receiving event 106, mobile device 124 can generate a geofence based on the set of geographic coordinates specified in event location 108. Mobile device 124 can monitor whether mobile device 124 has entered or exited the geofence using the one or more wireless access points.

For example, mobile device 124 can determine that mobile device 124 has moved away from wireless access point 126, e.g., by losing signals from wireless access point 126. Mobile device 124 can then determine that mobile device 124 is located within communication range of wireless access point 116, e.g., by detecting signals from wireless access point 116. Mobile device 124 can determine that, based on a location of wireless access point 116, that mobile device 124 is now located at location B, indicating that mobile device 124 has entered the geofence. Accordingly, mobile device 124 can determine that a condition for triggering action 104 is satisfied. Computer 114 can then perform action 104 as specified in event 106, for example, by providing alert dialog box 128 for display.

Exemplary Device Components

Figure 2:
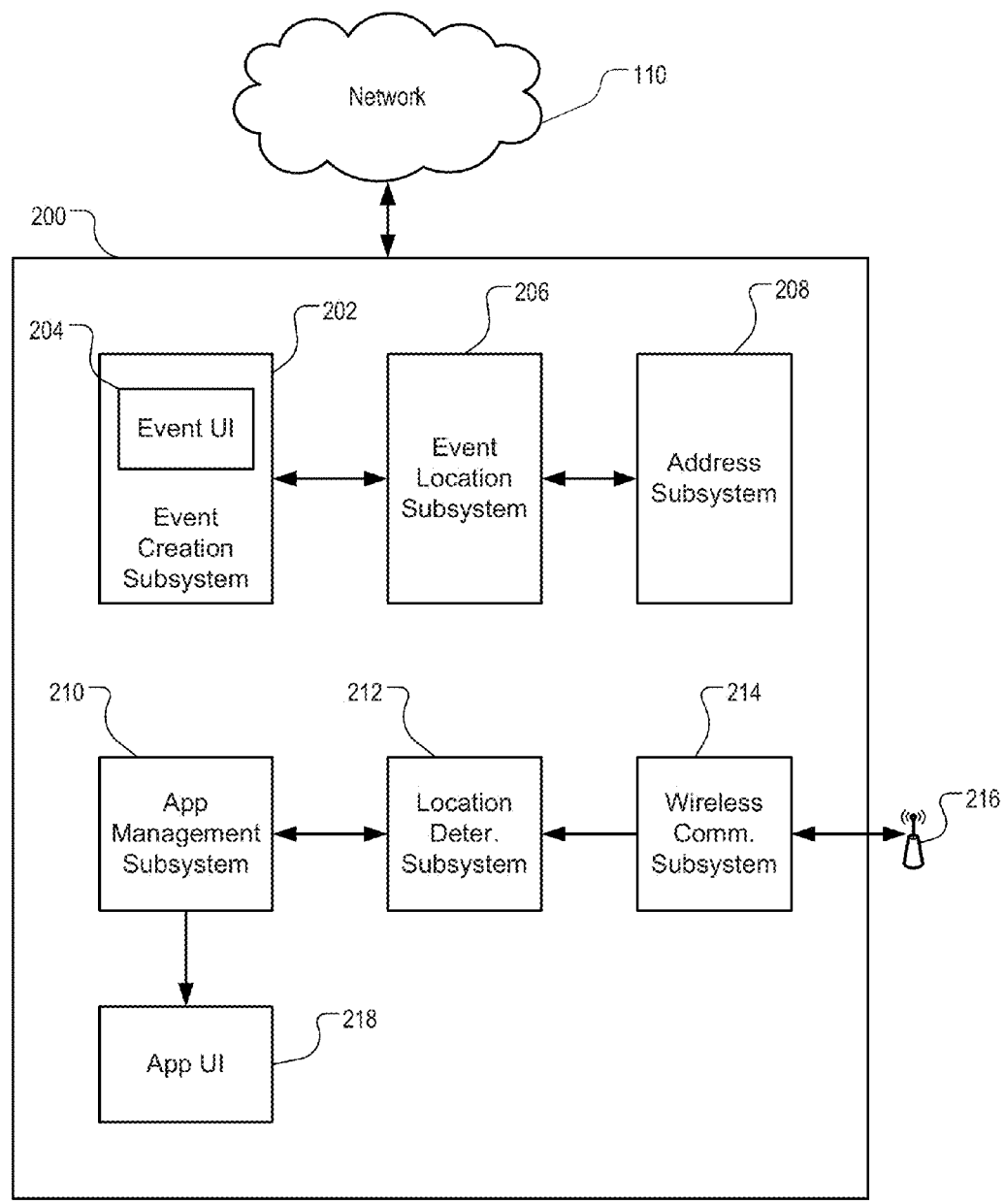
FIG. 2 is a block diagram of an exemplary system for configuring or presenting location-based reminders.

FIG. 2 is a block diagram of exemplary system 200 for configuring or presenting location-based reminders. System 200 can be implemented on one or more computers. The computers can be user devices or server computers.

System 200 can include event creation subsystem 202. Event creation subsystem 202 can be programmed to provide event user interface 204 for display on a user device, and receive user input through event user interface 204 specifying what action to take, e.g., presenting a reminder, at what venue location, at what time, and whether the action is going to be triggered by an entry into or exit from the venue location. Additional details of event user interface 204 for configuring a location-based reminder will be described below in reference to FIG. 3.

System 200 can include event location subsystem 206. Event location subsystem 206 can be programmed to determine an event location for performing the action based on a venue location. Event location subsystem 206 can receive the venue location from event creation subsystem, and determine a street address or a set of geographic coordinates. System 200 can include address subsystem 208 programmed to store associations between venue locations and addresses, or to interface with an external system to determine an address for a venue.

For example, event creation subsystem 202 can provide a venue location using a label "Home" to event location subsystem 206. Event location subsystem 206 can perform a search using address subsystem 208 to determine that the label "Home" is associated with a full street address. Event location subsystem 206 can further determine, through an internal or external system for mapping street addresses to geographic coordinates, a latitude coordinate, a longitude coordinate, and optionally, an altitude coordinate for the full street address. The altitude coordinate can be determined, for example, based on a portion of the full street address, e.g., "Apartment 402," that indicates a floor of the address, or based on geotagging. Event creation subsystem 202 can then create an event specifying an action, and an event condition associated with the action. The event condition can specify an event location and a trigger event. System 200 can store the trigger event in an event group, e.g., a reminder list, and send the event reminder to one or more user devices through communications network 110.

System 200 can include application management subsystem 210. Application management subsystem 210 can be programed to receive a request that corresponds to an event that specifies an action and an event condition, and perform the action according to the event condition. Application management subsystem 210 can communicate with location determination subsystem 212. Location determination subsystem 212 can be a component of system 200 configured to determine a device location, which is where a user device is located. Location determination subsystem 212 can determine the device location using information from wireless communication subsystem 214, which is configured to detect signals from and communicate with wireless access point 216. Wireless communication subsystem 214 can provide an identifier of wireless access point 216 to location determination subsystem 212. Location determination subsystem 212 can perform a search in a local or remote database to estimate a location of wireless access point 216, and determine a device location based on the location of wireless access point 216.

When application management subsystem 210 receives the device location from location determination subsystem 212, application management subsystem 210 can determine whether the event condition in the event. For example, application management subsystem 210 can determine whether the device location matches the event location. If the event condition is satisfied, application management subsystem 210 can cause the action to be performed, and present a result in application user interface 218. For example, application management subsystem 210 can launch an application or display an alert dialog box. Application user interface 218 will be described in additional details below in reference to FIG. 4.

In some implementations, system 200 can be implemented on a single user device. For example, system 200 can be implemented on a laptop or tablet device. The laptop or tablet device can receive user input for configuring a reminder at a first location (e.g., an office), and present the reminder when the laptop or tablet device moves to a second location (e.g., a home) that is different from the first location.

In some implementations, system 200 can be implemented on multiple user devices. For example, event creation system 202, event location subsystem 206, and address subsystem 208 can be implemented on a first user device located at a first location. The first user device can receive an input from a user, generate an event for performing an action at a location, and synchronize the event with a network-based service (e.g., an Internet based service). The network-based service can synchronize the event with one or more second user devices, for example, by sending a request to the one or more second user devices. The second user devices can be devices that have signed up for the network-based service. Application management subsystem 210, location determination subsystem 212, wireless communication subsystem 214, and application user interface 218 can be implemented on a second user device.

In some implementations, multiple components of system 200 can be implemented on one or more server computers. For example, event creation system 202, event location subsystem 206, address subsystem 208, application management subsystem 210, location determination subsystem 212, wireless communication subsystem 214, and application user interface 218 can be implemented on a server computer, which provides various services, e.g., event creation, reminder presentation, and synchronization between use devices as web services.

Exemplary User Interface

Figure 3:
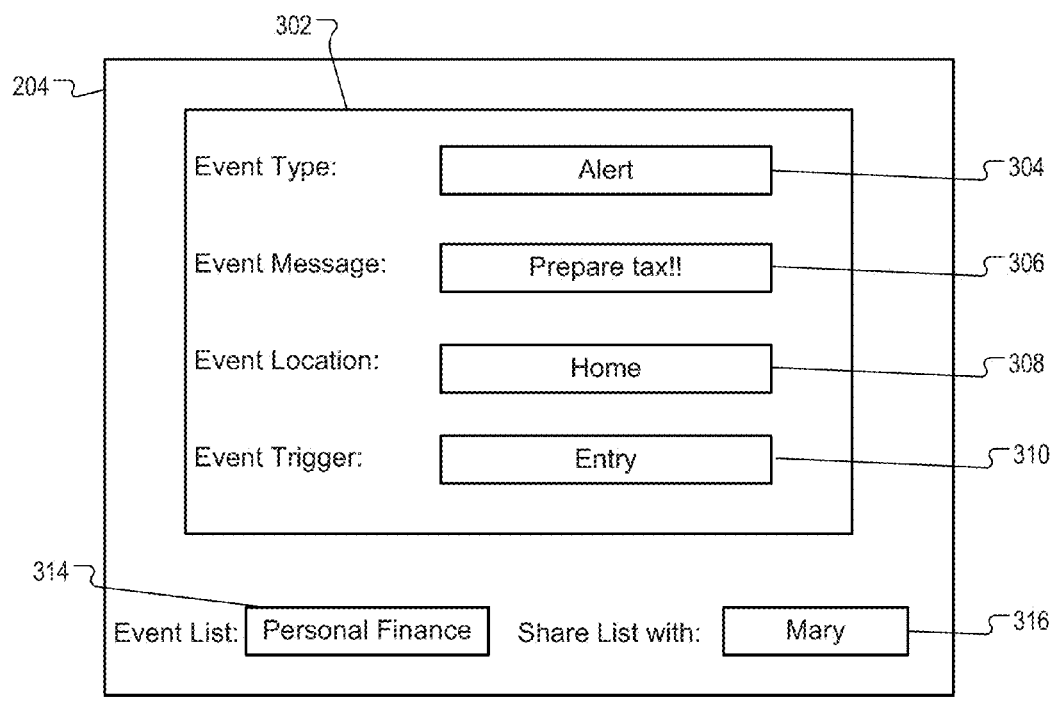
FIG. 3 illustrates an exemplary event user interface for configuring a location-based reminder.

FIG. 3 illustrates exemplary event user interface 204 for configuring a location-based reminder. Event user interface 204 can include event editor 302 for receiving user inputs for configuring an event. Event editor 302 can include event type editing field 304 for receiving an input specifying an action to be performed. The action can be presenting a reminder. The action can include, for example, presenting an alert dialog box, playing an audio message, launching an application program, providing force feedback (e.g., vibrating the device) or turning on or off an electronic device.

Event editor 302 can include event message editing field 306 for receiving input specifying a message to be displayed in an alert dialog box or played in an audio message. Event editor 302 can include event venue editing field 308 for receiving in input specifying a venue at which an action is to be performed. The venue can be a user created label, an event for associating with an address, or a complete or partial street address. Event editor 302 can include event trigger editing field 310 for receiving an input specifying one or more parameters of a trigger event for the action to be performed. The one or more parameters of the trigger event can specify that the trigger event is an entry into the venue location or an exit from the venue location. In some implementations, a trigger parameter can be a count, such that an action is triggered only upon a first, second, third, or n-th entry into or exit from the venue.

Event user interface 204 can include event list editing field 314. Events can be stored in a group, e.g., a folder or an event list. Each group can be associated with a category, which can be a label, e.g., "work related reminders" or "kids related reminders." Event list editing field 314 can receive an input specifying a group into which the event created through event editor 302 is entered. The group can be identified by the label.

Event user interface 204 can include event sharing field 316. An event group can be shared among multiple users. When an event group is shared, the system responsible for synchronizing events can push an event to devices of each of the users who share the event group. Any device of any of these users that is located at, or enters into or exits from an event location can be triggered to perform the action specified in the event of the shared group. Event sharing field 316 can receive an input specifying an identifier (e.g., a name) of a user or a group of users to share an event group.

Figure 4:
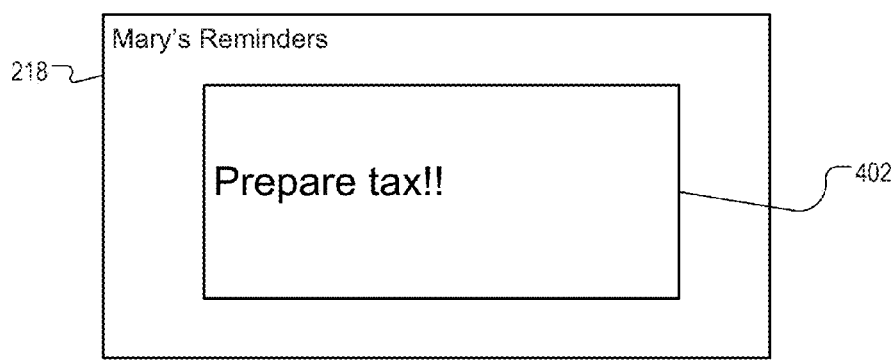
FIG. 4 illustrates an exemplary application user interface for presenting a location-based reminder.

FIG. 4 illustrates exemplary application user interface 218 for presenting a location-based reminder. Application user interface 218 can be an interface for a reminder program executing on a user device of a user sharing an event group. Application user interface 218 can include alert dialog box 402, which provides for display a message, e.g., the message specified in event message editing field 306 as described above in reference to FIG. 3.

Exemplary Processes

Figure 5:
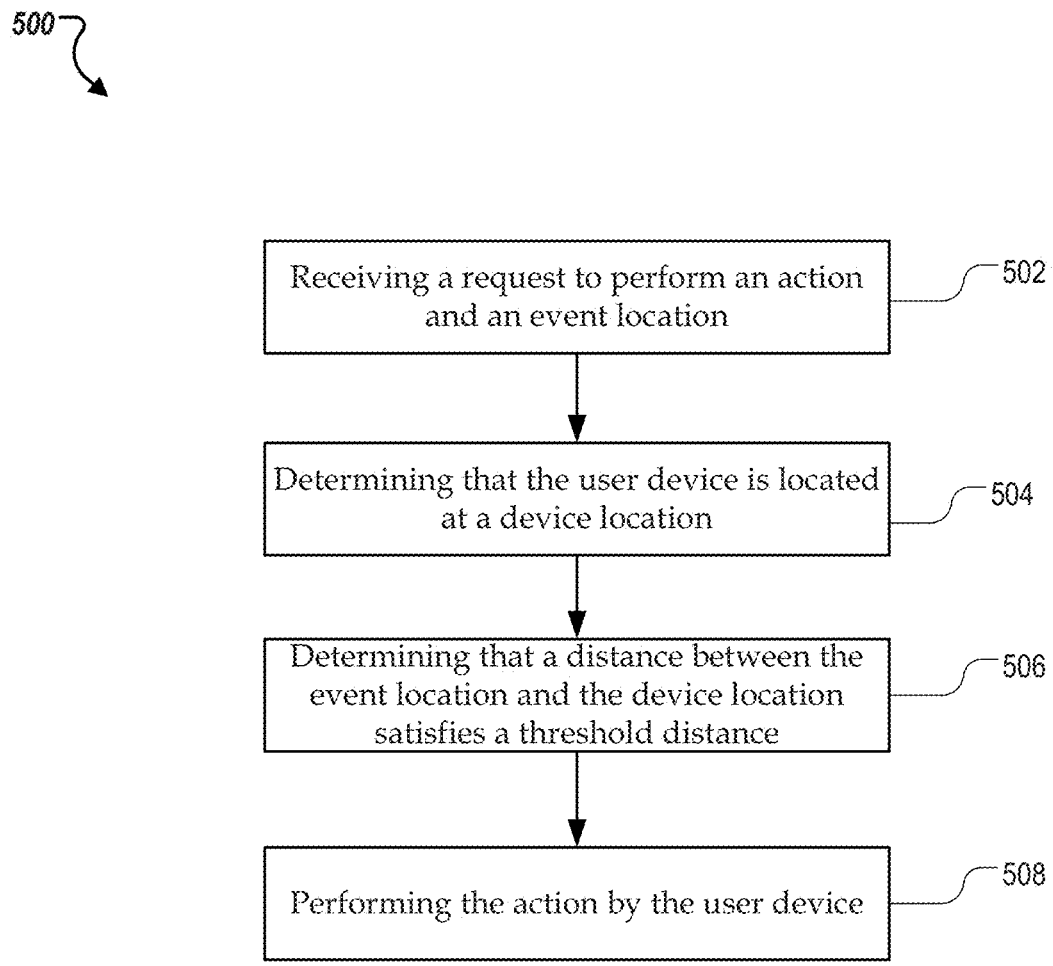
FIG. 5 is a flowchart of an exemplary process of presenting a location-based reminder.

FIG. 5 is a flowchart of exemplary process 500 of presenting a location-based reminder. Process 500 can be performed by a user device having the architecture described in reference to FIG. 2.

The user device can receive (502) a request to perform an action. The request can be associated with an activation condition specifying that the action is to be performed at a specified event location. The event location can include at least one of a street address or a set of geographic coordinates (e.g., latitude, longitude, and altitude).

The user device can determine (504), based on a wireless access point that is located within a wireless communication range of the user device, that the user device is located at a device location. The device location can include a latitude coordinate, a longitude coordinate, an optional altitude coordinate, and a radius representing a degree of uncertainty of the device location. Determining that the user device is located at the device location can include performing the following operations by the user device.

The user device can identify (e.g., identify from a database), an access point location of the wireless access point using an identifier (e.g., MAC address) of the wireless access point. The database can be a local or remote database storing identifiers of wireless access points and access point locations each corresponding to a respective identifier. The user device can determine the latitude coordinate, longitude coordinate, and radius of the device location based on the identified access point location.

The user device can determine (506) that a distance between the event location and the device location satisfies a threshold distance. In some implementations, the user device can make such determination by determining that the event location is located within the radius from the latitude coordinate and longitude coordinate of the device location. In some implementations, the user device is a mobile device. The user device can determine that the distance between the event location and the device location satisfies the threshold distance when the mobile device enters or exits a geofence. The geofence can be defined by a latitude coordinate, a longitude coordinate, and a radius that represents a degree of uncertainty about a location. The threshold distance can correspond to the radius. The latitude coordinate, longitude coordinate, and radius of the geofence can determined by geotagging the event location.

The user device can perform (508) the action when the threshold distance is satisfied. Performing the action can include providing for display a user interface item, e.g., a reminder that includes an alert dialog box, without requesting a user to login to the user device, if the user device has been previously registered with a server computer for providing location-based reminders. The server computer can push the request for performing the action at the event location to a group of registered user devices during synchronization of reminder events. The server computer can be located remotely from each of the group of user devices.

Figure 6:
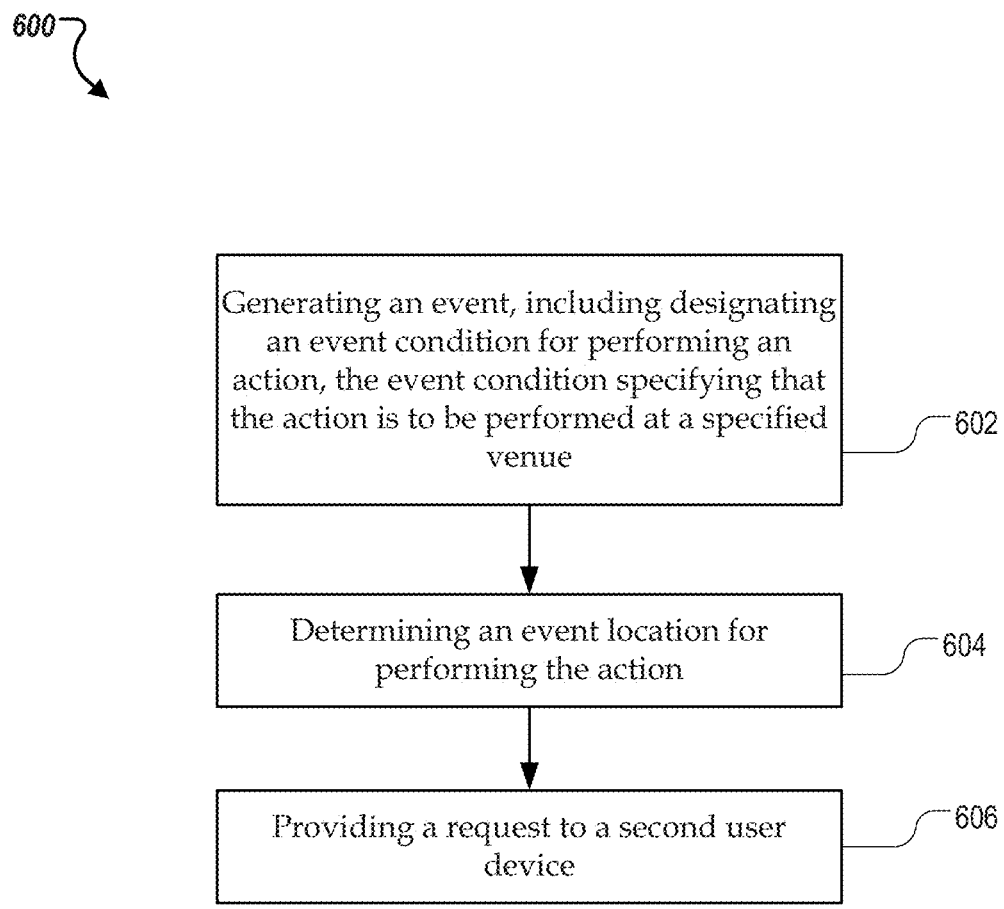
FIG. 6 is a flowchart illustrating an exemplary process of configuring a location-based reminder.

FIG. 6 is a flowchart illustrating an exemplary process 600 of configuring a location-based reminder. Process 600 can be performed by a user device having an architecture as described in reference to FIG. 2.

The user device can generate (602) an event. The user device can generate the event by creating a new event or modifying an existing event. Generating the event can include, based on an input, designating an event condition for performing and action. The event condition can specify that the action be performed at a specified venue. The action can include presenting a reminder. The venue can include an identifier of a social event that occurs at a place, e.g., a conference, sports event, concert, exposition, or a gathering. The venue can include a user-designated label of a geographic location, e.g., office, home, or school. The venue can include at least a portion of a street address.

In some implementations, the user device can store the event in an event group, e.g., a reminder list. The event group can correspond to a category of events. The user device can share the event group among multiple users. Each of the users can be identified by a user identifier.

The user device can determine (604), based on stored data associating the venue with an event location, the event location for performing the action. The event location can include a social event address, which can be a place where the social event occurs according to a context. The context can be a social event calendar. The event calendar can be stored on the user device or a server computer, or be generated based on results from a search. The event location can include a set of geographic coordinates. The event location can include a street address.

The user device can provide (606) a request to a second user device. The request can include an activation condition, which can cause the second user device to perform the action when the second user device is located at the event location. The user device and the second user device can be located at different locations. The activation condition can include the following components: a location trigger, a street address, and a set of geographic coordinates. The following is an example activation condition.

| List 1: Example Activation Condition |
|---|
| PROXIMITY: [ENTRANCE | EXIT | WITHIN]<br>LOCATION: [street address]<br>GEO: [latitude, longitude, altitude] |

In the example above, the "PROXIMITY" entry can define a trigger that an action is to be performed at a location, including, for example, when the second user device is located within a specified distance to a set of geographic coordinates. If a distance is set, the action can be triggered when the second mobile device is located within the distance plus the radius of a device location away from the geographic coordinates. If the distance is not explicitly set, the action can be triggered when the second mobile device is located within the radius of a device location away from the geographic coordinates. The "PROXIMITY" entry can additionally or alternatively specify whether the action is performed upon entry or exit of a location by the second user device. The LOCATION entry can include an address. The GEO entry can include a latitude coordinate, a longitude coordinate, and optionally, an altitude coordinate. Providing the request to the second user device can be done by a server computer, which can push the request to a group of second user devices in a synchronization operation.

Figure 7:
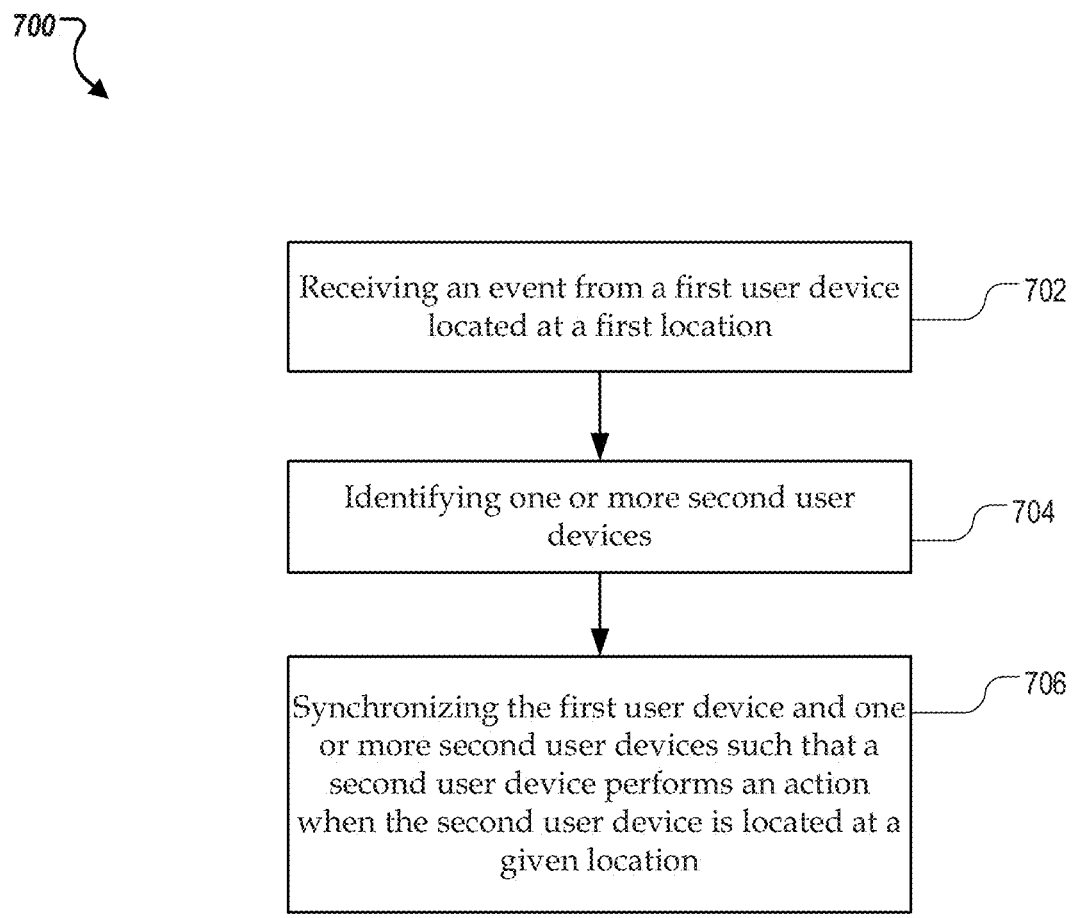
FIG. 7 is a flowchart illustrating an exemplary process of providing location-based reminders using a server.

FIG. 7 is a flowchart illustrating exemplary process 700 of providing location-based reminders using a server. The server can include one or more server computers programmed to process requests received from user devices and provide responses to the user devices in response to the requests.

The server can receive (702) an event from a first user device located at a first location. The event can specify an action and an event location, and a request that the action is to be performed at the event location. The action can be presenting a reminder in a visual, an audio, or a mechanical user interface. The mechanical user interface can include a mechanical component for generating a vibrating force.

The server can identify (704) one or more second user devices based on an event group of which the event is a member. The event group can be shared among a user of the first user device and one or more users of the one or more second user devices.

The server can synchronize (706) the first user device and one or more second user devices. The server can push the event to the one or more second user devices such that, when any one of the one or more second user devices is located at the event location, the second user device performs the action. Pushing the event to a user device can include sending the event to a user device without receiving a request from the user device for the event. The first user device can be located remotely from each of the one or more second user devices.

In some implementations, the server can receive an event update from the first user device modifying the action or the event location. The server can automatically push the update to each of the one or more user devices.

Exemplary System Architecture

Figure 8:
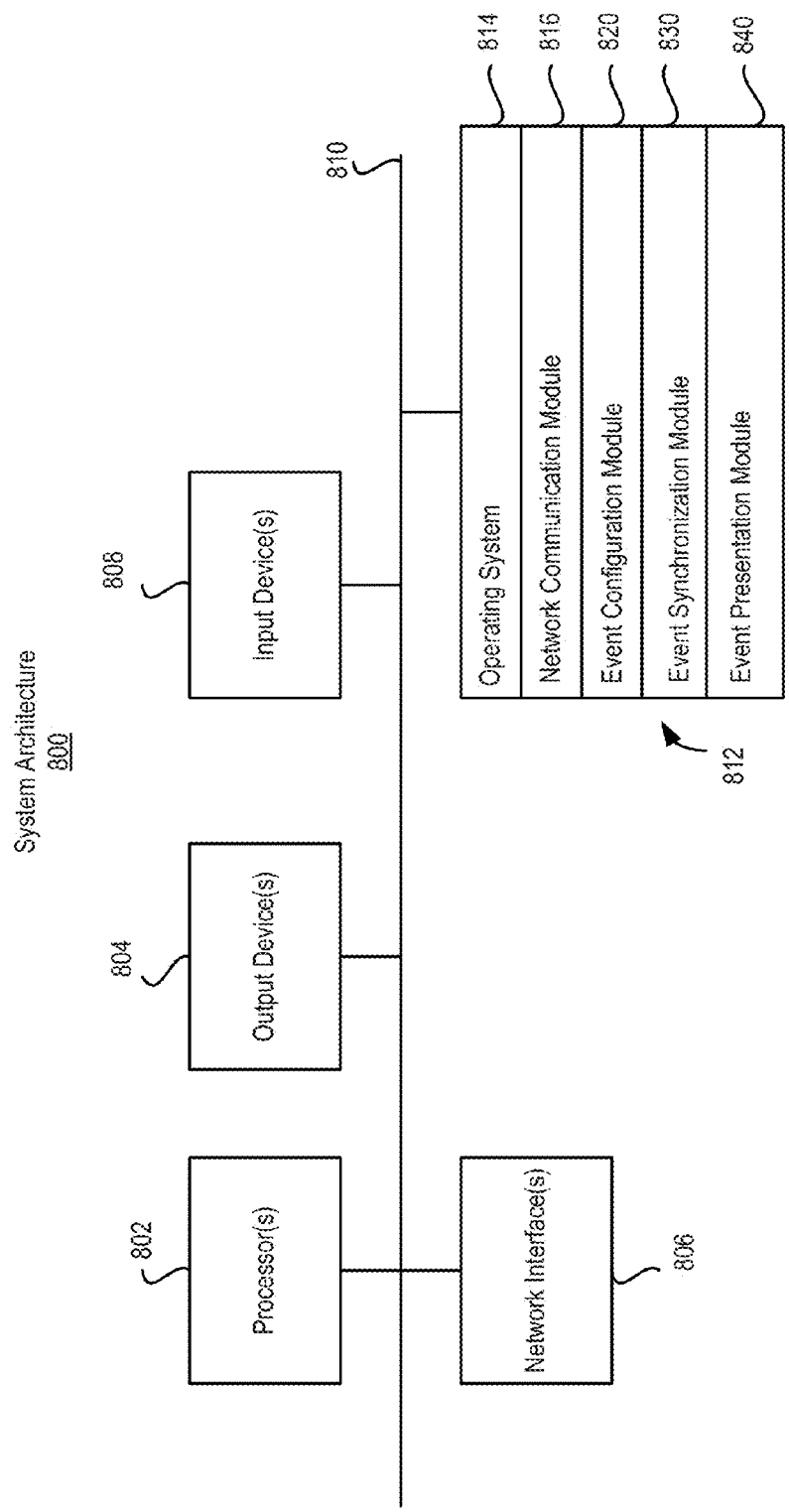
FIG. 8 is a block diagram of an exemplary system architecture for implementing the features and operations of location-based reminders.

FIG. 8 is a block diagram of an exemplary system architecture for implementing the features and operations of location-based reminders. Other architectures are possible, including architectures with more or fewer components. In some implementations, architecture 800 includes one or more processors 802 (e.g., dual-core Intel® Xeon® Processors), one or more output devices 804 (e.g., LCD), one or more network interfaces 806, one or more input devices 808 (e.g., mouse, keyboard, touch-sensitive display) and one or more computer-readable media 812 (e.g., RAM, ROM, SDRAM, hard disk, optical disk, flash memory, etc.). These components can exchange communications and data over one or more communication channels 810 (e.g., buses), which can utilize various hardware and software for facilitating the transfer of data and control signals between components.

The term "computer-readable medium" refers to any medium that participates in providing instructions to processor 802 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 812 can further include operating system 814 (e.g., Mac OS® server, Windows® NT server), network communications module 816, event configuration module 820, event synchronization module 830, and event presentation module 840. Event configuration module 820 can be programmed to receive a input for configuring an event specifying that an action be performed at a location. Event synchronization module 830 can be programmed to synchronize events among user devices located remotely from one another. Event presentation module 840 can be programmed to determine a location of a user device and cause the user device to perform an action, e.g., present a reminder, when the user device is located at a given location. Operating system 814 can be multi-user, multiprocessing, multitasking, multithreading, real time, etc. Operating system 814 performs basic tasks, including but not limited to: recognizing input from and providing output to devices 806, 808; keeping track and managing files and directories on computer-readable media 812 (e.g., memory or a storage device); controlling peripheral devices; and managing traffic on the one or more communication channels 810. Network communications module 816 includes various components for establishing and maintaining network connections (e.g., software for implementing communication protocols, such as TCP/IP, HTTP, etc.). Computer-readable medium 812 can further include a database interface. The database interface can include interfaces to one or more databases on a file system. The databases can be organized under a hierarchical folder structure, the folders mapping to directories in the file system.

Architecture 800 can be included in any device capable of hosting a database application program. Architecture 800 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

Exemplary Mobile Device Architecture

Figure 9:
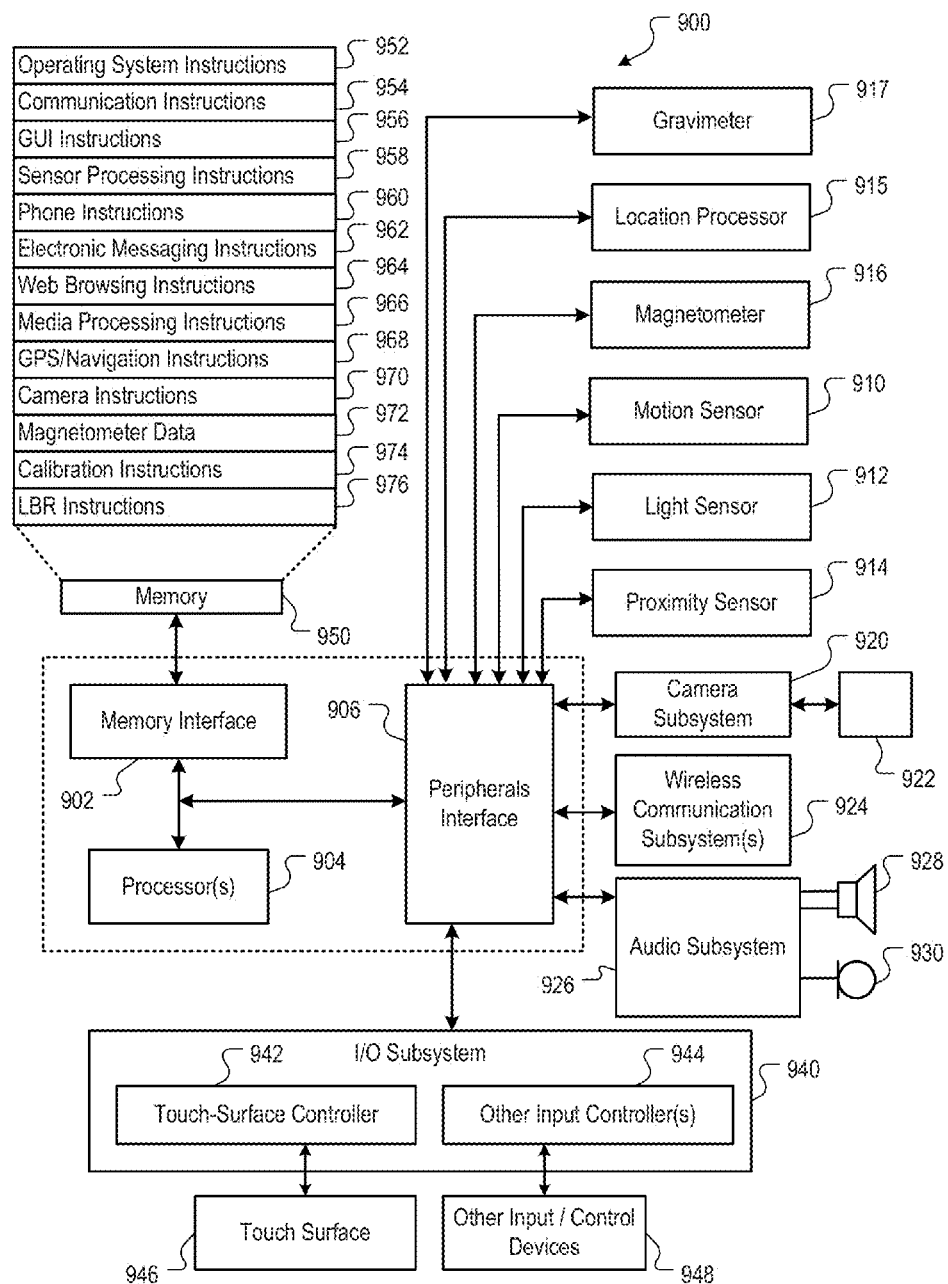
FIG. 9 is a block diagram illustrating an exemplary device architecture of a mobile device implementing the features and operations of location-based reminders.

FIG. 9 is a block diagram illustrating an exemplary device architecture 900 of a mobile device implementing the features and operations of pattern-based gesture recognition. A mobile device can include memory interface 902, one or more data processors, image processors and/or processors 904, and peripherals interface 906. Memory interface 902, one or more processors 904 and/or peripherals interface 906 can be separate components or can be integrated in one or more integrated circuits. Processors 904 can include one or more application processors (APs) and one or more baseband processors (BPs). The application processors and baseband processors can be integrated in one single process chip. The various components in a mobile device, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Motion sensor 910 can include one or more accelerometers configured to determine change of speed and direction of movement of the mobile device. Gravimeter 917 can include one or more devices connected to peripherals interface 906 and configured to measure a local gravitational field of Earth.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a CDMA system, a WiFi™ or WiMax™ network, and a Bluetooth™ network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions.

I/O subsystem 940 can include touch surface controller 942 and/or other input controller(s) 944. Touch-surface controller 942 can be coupled to a touch surface 946 (e.g., touch screen or pad). Touch surface 946 and touch surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch surface 946 (e.g., a touch screen); and a pressing of the button for a second duration that is longer than the first duration may turn power to a mobile device on or off. The user may be able to customize a functionality of one or more of the buttons. The touch surface 946 can, for example, also be used to implement virtual or soft buttons and/or a keyboard.

In some implementations, a mobile device can present recorded audio and/or video files, such as MP3, AAC, and MPEG files. In some implementations, a mobile device can include the functionality of an MP3 player. A mobile device may, therefore, include a pin connector. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; camera instructions 970 to facilitate camera-related processes and functions; magnetometer data 972 and calibration instructions 974 to facilitate magnetometer calibration. The memory 950 may also store other software instructions (not shown), such as security instructions, web video instructions to facilitate web video-related processes and functions, and/or web-shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950. Memory 950 can include location-based reminder instructions 976. Location-based reminder instructions 976 can be a computer program product that is configured to cause the mobile device to perform operations of configuring or presenting a location-based reminder.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of the mobile device may be implemented in hardware and/or in software, including in one or more signal processing and/or application specific integrated circuits.

Exemplary Operating Environment

Figure 10:
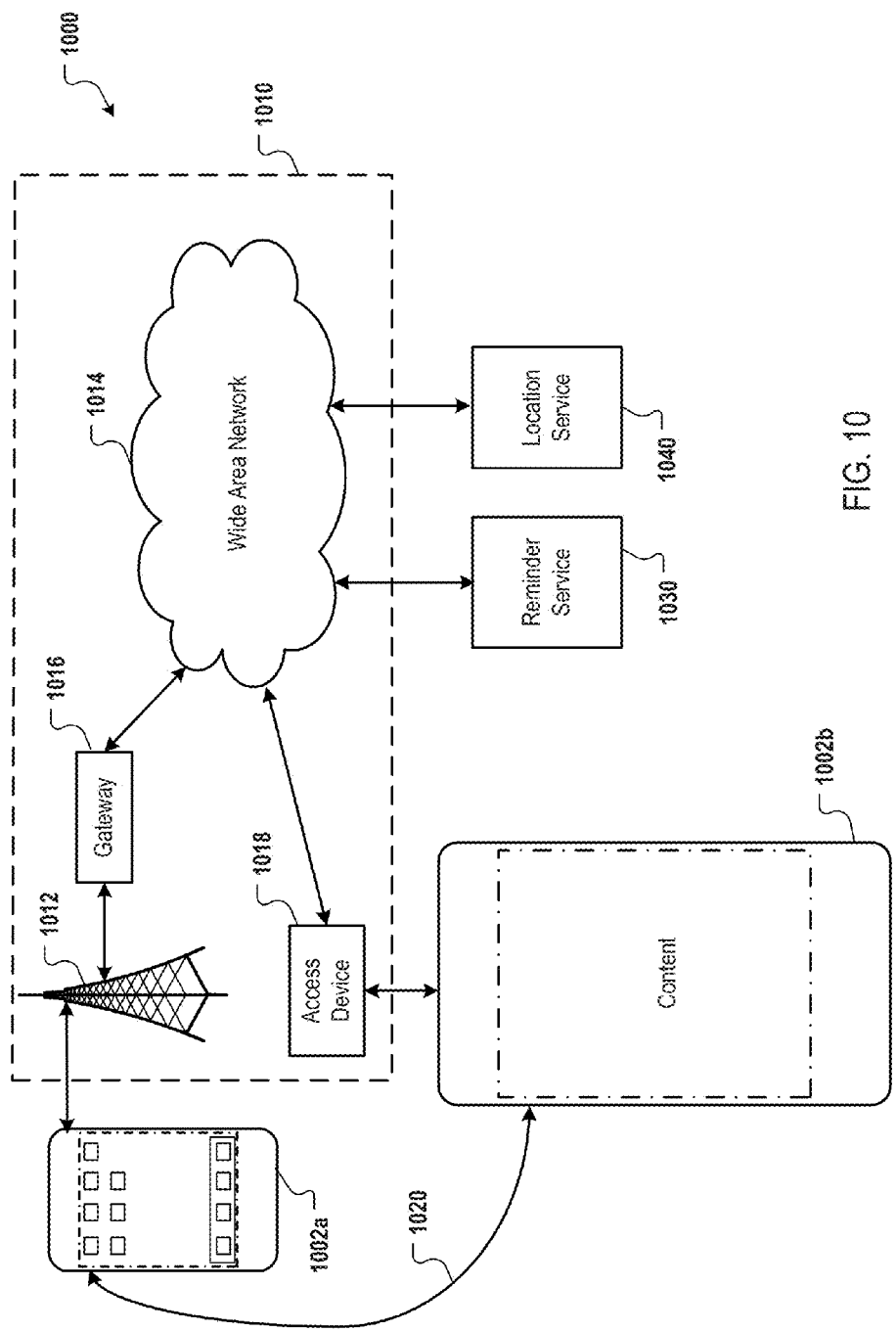
FIG. 10 is a block diagram of exemplary network operating environment for the mobile devices implementing the features and operations of location-based reminders.

FIG. 10 is a block diagram of exemplary network operating environment 1000 for the mobile devices implementing the features and operations of location-based reminders. Mobile devices 1002a and 1002b can be the first user device and second user device, respectively, as described above. Mobile devices 1002a and 1002b can, for example, communicate over one or more wired and/or wireless networks 1010 in data communication. For example, a wireless network 1012, e.g., a cellular network, can communicate with a wide area network (WAN) 1014, such as the Internet, by use of a gateway 1016. Likewise, an access device 1018, such as an 802.11g wireless access device, can provide communication access to the wide area network 1014.

In some implementations, both voice and data communications can be established over wireless network 1012 and the access device 1018. For example, mobile device 1002a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1012, gateway 1016, and wide area network 1014 (e.g., using Transmission Control Protocol/Internet Protocol (TCP/IP) or User Datagram Protocol (UDP)). Likewise, in some implementations, the mobile device 1002b can place and receive phone calls, send and receive e-mail messages, and retrieve electronic documents over the access device 1018 and the wide area network 1014. In some implementations, mobile device 1002a or 1002b can be physically connected to the access device 1018 using one or more cables and the access device 1018 can be a personal computer. In this configuration, mobile device 1002a or 1002b can be referred to as a "tethered" device.

Mobile devices 1002a and 1002b can also establish communications by other means. For example, wireless mobile device 1002a can communicate with other wireless devices, e.g., other mobile devices 1002a or 1002b, cell phones, etc., over the wireless network 1012. Likewise, mobile devices 1002a and 1002b can establish peer-to-peer communications 1020, e.g., a personal area network, by use of one or more communication subsystems, such as the Bluetooth™ communication devices. Other communication protocols and topologies can also be implemented.

The mobile device 1002a or 1002b can, for example, communicate with one or more services 1030 and 1040 over the one or more wired and/or wireless networks. For example, one or more reminder services 1030 can be used to provide user interfaces for configuring an event or presenting a reminder, to synchronize events between mobile devices 1002a and 1002b, and to provide sharing of event groups. Location service 1040 can provide locations of one or more wireless access points to mobile devices 1002a and 1002b, or to determine a street address or a set of geographic coordinates based on a partial address or a social event.

Mobile device 1002a or 1002b can also access other data and content over the one or more wired and/or wireless networks. For example, content publishers, such as news sites, Rally Simple Syndication (RSS) feeds, web sites, blogs, social networking sites, developer networks, etc., can be accessed by mobile device 1002a or 1002b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method, comprising:
    receiving, by one or more server computers, an event definition and a user identifier from a first user device located at a first location, the event definition specifying an action, an event group, and an event location, wherein the event definition specifies that a device associated with the user identifier performs the action upon a condition that the device enters into or exits from the event location, the event group corresponding to a category of events that includes the action, the condition, and the event location, the user identifier being designated as a member of a group of one or more users that are associated with the event group;
    identifying, by the one or more server computers, one or more second user devices based on the event group, including determining that the one or more second user devices are associated with the user identifier; and
    synchronizing, by the one or more server computers, the first user device and one or more second user devices, the synchronizing including sharing the event group between the first user device and the one or more second user devices by pushing the event definition, including the condition and the event location, to the one or more second user devices, the pushing causing an entry into or exit from the event location by each of the one or more second user devices, as detected by the each second user device, to trigger the second user device that detected the entry or exit to perform the action, wherein the action is presenting a reminder in a visual, an audio, or a mechanical user interface.

2. The method of claim 1, wherein:
    the method comprises determining a device location of the second user device by the second user device or by the one or more server computers;
    the event location includes at least one of a street address or a set of geographic coordinates;
    the device location includes a latitude coordinate, a longitude coordinate, and a radius; and
    determining the device location of the second user device comprises:
        identifying, from a database, an access point location of the wireless access point using an identifier of the wireless access point, the database storing identifiers of wireless access points and access point locations each corresponding to a respective identifier; and
        determining the latitude coordinate, longitude coordinate, and radius of the device location based on the identified access point location.

3. The method of claim 1, wherein performing the action comprises providing for display a user interface item without requesting the user to login to the second user device.

4. The method of claim 1, wherein the first user device is located remotely from each of the one or more second user devices.

5. The method of claim 1, comprising:
    receiving, by one or server computers, an event update from the first user device; and
    pushing, by one or more server computers, the update to each of the one or more user devices.

6. A non-transitory storage device storing a computer program product, the computer program product operable to cause one or more server computers to perform operations comprising:
    receiving, by one or more server computers, an event definition and a user identifier from a first user device located at a first location, the event definition specifying an action, an event group, and an event location, wherein the event definition specifies that a device associated with the user identifier performs the action upon a condition that the device enters into or exits from the event location, the event group corresponding to a category of events that includes the action, the condition, and the event location, the user identifier being designated as a member of a group of one or more users that are associated with the event group;

identifying, by the one or more server computers, one or more second user devices based on the event group, including determining that the one or more second user devices are associated with the user identifier; and synchronizing, by the one or more server computers, the first user device and one or more second user devices, the synchronizing including sharing the event group between the first user device and the one or more second user devices by pushing the event definition, including the condition and the event location, to the one or more second user devices, the pushing causing an entry into or exit from the event location by each of the one or more second user devices, as detected by the each second user device, to trigger the second user device to perform the action, wherein the action is presenting a reminder in a visual, an audio, or a mechanical user interface.

7. The non-transitory storage device of claim 6, wherein the first user device is located remotely from each of the one or more second user devices.

8. The non-transitory storage device of claim 6, the operations comprising:
receiving, by one or server computers, an event update from the first user device; and
pushing, by one or more server computers, the update to each of the one or more user devices.

9. A system comprising:
a first user device;
one or more second user devices; and
one or more server computers configured to perform operations comprising:
receiving an event, an event group, and a user identifier from a first user device located at a first location, the event specifying an action and an event location and requesting that the action is to be performed upon a condition that the device enters into or exits from the event location, the event group corresponding to a category of events that includes the action, the condition, and the event location, the user identifier being designated as a member of a group of one or more users that are associated with the event group;

identifying one or more second user devices based on the event group, including determining that the one or more second user devices are associated with the user identifier; and synchronizing the first user device and one or more second user devices, the synchronizing including sharing the event group between the first user device and the one or more second user devices by pushing the event definition, including the condition and the event location, to the one or more second user devices, the pushing causing an entry into or exit from the event location by each of the one or more second user devices, as detected by the each second user device, to trigger the second user device that detected the entry or exit to perform the action, wherein the action is presenting a reminder in a visual, an audio, or a mechanical user interface.

10. The system of claim 9, wherein:
the operations comprise determining a device location of the second user device by the second user device or by the one or more server computers;
the event location includes at least one of a street address or a set of geographic coordinates;
the device location includes a latitude coordinate, a longitude coordinate, and a radius; and
determining the device location comprises:
identifying, from a database, an access point location of the wireless access point using an identifier of the wireless access point, the database storing identifiers of wireless access points and access point locations each corresponding to a respective identifier; and
determining the latitude coordinate, longitude coordinate, and radius of the device location based on the identified access point location.

11. The system of claim 9, wherein the first user device is located remotely from each of the one or more second user devices.

12. The system of claim 9, the operations comprising:
receiving, by one or server computers, an event update from the first user device; and
pushing, by one or more server computers, the update to each of the one or more user devices.

* * * * *

UNITED STATES PATENT AND TRADEMARK OFFICE
CERTIFICATE OF CORRECTION

| | | |
|---|---|---|
| PATENT NO. | : 8,942,729 B2 | Page 1 of 1 |
| APPLICATION NO. | : 13/633649 | |
| DATED | : January 27, 2015 | |
| INVENTOR(S) | : Chelsea J LeBlanc et al. | |

It is certified that error appears in the above-identified patent and that said Letters Patent is hereby corrected as shown below:

On the Title Page, Item (54) and in the Specification, Column 1, Line 1, Title, replace:
"LOCATION BASED METHODS, SYSTEMS, AND PROGRAM PRODUCTS FOR PERFORMING AN ACTION AT A USER DEVICE" with
-- LOCATION-BASED METHODS, SYSTEMS, AND PROGRAM PRODUCTS FOR PERFORMING AN ACTION AT A USER DEVICE --

In the Claims

Column 14, Line 57 at Claim 5; replace:
"receiving, by one or server computers, an event update" with
-- receiving, by one or more server computers, an event update --

Column 15, Line 31 at Claim 8; replace:
"receiving, by one or server computers, an event update" with
-- receiving, by one or more server computers, an event update --

Column 16, Line 42 at Claim 12; replace:
"receiving, by one or server computers, an event update" with
-- receiving, by one or more server computers, an event update --

Signed and Sealed this
Twenty-ninth Day of September, 2015

Michelle K. Lee
*Director of the United States Patent and Trademark Office*